(12) United States Patent
Thoumazet et al.

(10) Patent No.: US 9,051,213 B2
(45) Date of Patent: Jun. 9, 2015

(54) PROCESS FOR MANUFACTURING A HYDROPHOBIC GLAZING CONTAINING A CARBON RICH SILICON OXYCARBIDE TIE LAYER

(71) Applicant: SAINT-GOBAIN GLASS FRANCE, Courbevoie (FR)

(72) Inventors: Claire Thoumazet, Paris (FR); Martin Melcher, Herzogenrath (DE); Arnaud Huignard, Campigne (FR); Raphael Lante, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/358,496

(22) PCT Filed: Nov. 14, 2012

(86) PCT No.: PCT/FR2012/052621
§ 371 (c)(1),
(2) Date: May 15, 2014

(87) PCT Pub. No.: WO2013/072622
PCT Pub. Date: May 23, 2013

(65) Prior Publication Data
US 2014/0315027 A1    Oct. 23, 2014

(30) Foreign Application Priority Data

Nov. 16, 2011  (FR) .................................. 11 604919

(51) Int. Cl.
C03C 17/34  (2006.01)
C03C 23/00  (2006.01)
C03C 17/42  (2006.01)

(52) U.S. Cl.
CPC .............. C03C 17/42 (2013.01); C03C 23/006 (2013.01); C03C 2217/76 (2013.01); C03C 2218/1525 (2013.01); C03C 17/3417 (2013.01)

(58) Field of Classification Search
CPC   C03C 17/34; C03C 17/3429; C03C 17/3441; C03C 23/06; C03C 23/007
USPC ........................ 427/249.15, 255.31, 255.32
See application file for complete search history.

(56) References Cited

U.S. PATENT DOCUMENTS

| 7,482,060 | B2 * | 1/2009 | Oudard ......................... 428/428 |
| 2004/0029400 | A1 * | 2/2004 | Gaillard et al. ............... 438/778 |
| 2004/0175929 | A1 * | 9/2004 | Schmitt et al. ................ 438/628 |
| 2008/0241523 | A1 |  10/2008 | Huignard et al. |
| 2011/0305874 | A1 * | 12/2011 | Thoumazet et al. .......... 428/172 |
| 2012/0252227 | A1 * | 10/2012 | Owada et al. ................. 438/778 |

FOREIGN PATENT DOCUMENTS

| FR | 2 866 643 | 8/2005 |
| WO | 2010 079299 | 7/2010 |
| WO | WO 2010/079299 A1 * | 7/2010 |

OTHER PUBLICATIONS

Walkiewicz-Pietrzykowska, Agnieszka, et al., "Type of precursor and synthesis of silicon oxycarbide (SiOxCyH) thin films with a surfatron microwave oxygen/argon plasma". J. Vac. Sci. Technol. A 24(4), Jul./Aug. 2006, pp. 988-994.*

Haubmann, Michael, et al., "Thermal degradation of polymethylsilsesquioxane and microstructure of the derived glasses." Journal of Analytical and Applied Pyrolysis, 91 (2011) 224-231.*

International Searh Report Issued Jan. 10, 2013 in PCT FR2/052621 Filed Nov. 14, 2012.

* cited by examiner

*Primary Examiner* — Bret Chen
(74) *Attorney, Agent, or Firm* — Oblon, McClelland, Maier & Neustadt, L.L.P.

(57) ABSTRACT

A process for manufacturing a hydrophobic glazing by: (i) forming a carbon-rich $SiO_xC_y$ layer at a surface of a mineral glass substrate via CVD by contacting the surface with a stream containing $C_2H_4$, $SiH_4$, and $CO_2$ with an $C_2H_4/SiH_4$ ratio of less than or equal to 3.3 by volume, at a temperature of between 600° C. and 680° C.; (ii) forming a $SiO_2$ layer or a carbon-poor silicon oxycarbide layer with a mean C/Si ratio of less than 0.2 on the carbon-rich $SiO_xC_y$ layer, thereby obtaining a layered substrate; (iii) annealing and/or shaping the layered substrate at a temperature of between 580° C. and 700° C.; (iv) activating the $SiO_2$ layer or the carbon-poor silicon oxycarbide layer by plasma treatment or acidic or basic chemical treatment; and (v) grafting, by covalent bonding, a fluorinated hydrophobic agent to the surface of the $SiO_2$ layer or the carbon-poor silicon oxycarbide layer.

13 Claims, No Drawings

PROCESS FOR MANUFACTURING A HYDROPHOBIC GLAZING CONTAINING A CARBON RICH SILICON OXYCARBIDE TIE LAYER

The present invention relates to a process for the preparation of a hydrophobic glazing and to a hydrophobic glazing, in particular a windshield, obtained by this process.

There exists on the market numerous products made of mineral glass exhibiting a hydrophobic surface obtained by covalent grafting of hydrophobic agents generally exhibiting a silicone or perfluoroalkyl chain.

These glass products having a hydrophobic nature are used, for example, as glazings for windows, for shower cubicles or for motor vehicle glazings.

However, the majority of products gradually lose their hydrophobic nature after a certain period of time which can range from a few months to a few years. This loss in hydrophobicity is particularly rapid for glazings, such as windshields, subjected to major chemical and physical stresses, such as wiping by windshield wipers, changes in temperature, atmospheric pollution, sunlight, and the like.

International application WO2010/125964 discloses a hydrophobic glazing composed of a mineral glass substrate and of a tie sublayer based on an organometallic compound which can comprise from 0.3% to 50% of carbon, nitrogen, chlorine and/or fluorine atoms. The sublayer exhibits functional groups capable of reacting with the silyl functional groups of a hydrophobic agent of fluorinated ether type.

International application WO2010/079299 on behalf of the Applicant Company discloses a process for producing a hydrophobic coating on a glass substrate comprising the formation of a sublayer based on silicon oxycarbide. The determining parameter for the durability is the roughness of the tie sublayer, which has to be at least equal to 4 nm (RMS roughness).

Central Glass Co. currently provides, under the trade name Aquasplash®, hydrophobic windshields with a surface layer composed of a mixture of fluorosilanes and silicone. However, the Applicant Company has found that the durability of these glazings is less than 3 years.

Thus, until now there exists no solution which makes it possible to provide windshields retaining a satisfactory hydrophobic nature for at least 3 years.

In the context of its research studies targeted at improving the hydrophobic nature of windshields and at prolonging it even beyond these three years, the Applicant Company found, with a degree of surprise, that the chemical composition of a tie layer made of silicon oxycarbide and in particular the carbon richness of such a layer, subsequently used for the covalent grafting of a hydrophobic agent, had a significant and unexpected effect on the longevity of the grafted hydrophobic coating.

The Applicant Company has observed in particular that, when the carbon/silicon (C/Si) ratio in a thin $SiO_xC_y$ layer is greater than 0.4 over a significant depth of said layer, the loss of the contact angle of a drop of deionized water was greatly reduced in comparison with layers not achieving this C/Si ratio or achieving this ratio in an excessively localized fashion, that is to say over only a small fraction of their depth.

In addition, the Applicant Company has found that a high proportion of carbon is obtained over a significant depth of the $SiO_xC_y$ layer not by increasing but, surprisingly, by reducing the ethylene ($C_2H_4$) stream in comparison with the silane ($SiH_4$) stream in the process for chemical vapor deposition (CVD) of the silicon oxycarbide layer.

These combined discoveries have formed the subject matter of a separate patent application, filed on the same day as the present application.

The hydrophobic glazings carrying carbon-rich tie sublayers thus obtained exhibited, however, a high sensitivity to scratching, which represents a troublesome disadvantage, in particular in the case of glazings exposed to fairly high abrasion, such as, for example, windshields.

In the context of its research studies targeted at optimizing hydrophobic glazings even more, the Applicant Company has discovered that it is possible to considerably increase the scratch resistance of hydrophobic glazings by depositing, on the first carbon-rich silicon oxycarbide sublayer, a second SiOC sublayer which is poorer in carbon or devoid of carbon (in other words, a silica layer), without this significantly reducing the longevity of the grafted hydrophobic coating.

The retention of this longevity of the hydrophobic coating could not in fact be in any way predicted in the light of the prior results, which had shown that it depended on the chemical composition and in particular on the carbon content of the tie layer. A person skilled in the art thus had every reason to believe that, by inserting a thin layer between the carbon-rich SiOC layer and the hydrophobic agent, he would reduce the longevity of the hydrophobic coating.

A subject matter of the present invention is consequently a process for the manufacture of a hydrophobic glazing comprising the following successive stages:

(a) formation of a carbon-rich silicon oxycarbide ($SiO_xC_y$) layer at the surface of a substrate made of mineral glass by chemical vapor deposition (CVD) over at least a portion of the surface of said substrate by bringing said surface into contact with a stream of reactive gases comprising ethylene ($C_2H_4$), silane ($SiH_4$) and carbon dioxide ($CO_2$) at a temperature of between 600° C. and 680° C., preferably between 610° C. and 660° C., the ethylene/silane ($C_2H_4/SiH_4$) ratio by volume during stage (a) being less than or equal to 3.3, (b) formation of an $SiO_2$ layer on the silicon oxycarbide layer deposited in stage (a) or (b') formation of a carbon-poor silicon oxycarbide layer exhibiting a mean C/Si ratio of less than 0.2, preferably less than 0.1, on the $SiO_xC_y$ layer deposited in stage (a), (c) annealing and/or shaping the substrate obtained on conclusion of stage (b) or (b') at a temperature of between 580° C. and 700° C., preferably between 600° C. and 680° C., (d) activation of the silica layer or of the silicon oxycarbide layer by plasma treatment or acidic or basic chemical treatment and (e) grafting, by covalent bonding, a fluorinated hydrophobic agent to the surface of the silica or $SiO_xC_y$ layer.

An additional subject matter of the present invention is a hydrophobic glazing capable of being obtained by such a process.

The process according to the invention thus exists in the form of two alternative forms, the first comprising the successive stages (a), (b), (c), (d) and (e) and the second comprising the successive stages (a), (b'), (c), (d) and (e).

In fact, the first alternative form is only a limiting case of the second alternative form. This is because silica ($SiO_2$) can be regarded as a carbon-poor silicon oxycarbide ($SiO_xC_y$) layer in which the concentration of carbon is zero (y=0).

The first stage of the process according to the invention (stage (a)) is preferably carried out on float glass inside the furnace on the tin bath or immediately after exiting from the furnace. A particularly advantageous embodiment consists in carrying out the deposition by CVD inside the furnace, where it is relatively easy to create a confined atmosphere essential for satisfactory control of the chemical composition of the reactive mixture and of the layer deposited.

The mixture of reactive gases is introduced into the furnace via a nozzle, the width of which preferably covers at least 90% of the width of the ribbon of glass passing through the furnace. The reactive gases ($C_2H_4$, $SiH_4$, $CO_2$) are generally mixed with an inert carrier gas or diluent gas, such as nitrogen ($N_2$).

The deposition of thin silicon oxycarbide layers by CVD is known and the person skilled in the art would know how to adjust the flow rates of the reactive gases as a function of the rate of progression of the glass, of the temperatures of the furnace and of the thickness of the layers which he wishes to obtain.

In the present invention, the experimental conditions of stage (a) (rate of progression of the ribbon, flow rate of the reactive gases, and the like) are preferably adjusted so that the thickness of the $SiO_xC_y$ layer deposited is between 10 and 200 nm, in particular between 20 and 100 nm and particularly preferably between 40 and 70 nm.

The temperatures indicated above for stage (a) are those of the tin bath in the immediate vicinity of (less than 20 cm) from the deposition nozzle via which the mixture of reactive gases arrives.

The ratio of the oxidizing gas ($CO_2$) to the silane ($SiH_4$) is generally between 1 and 50, preferably between 1.5 and 10 and in particular between 2 and 6.

As explained above, the Applicant Company has discovered that, rather surprisingly, carbon-rich silicon oxycarbide layers are obtained by using, for stage (a), a relatively low ethylene/silane ($C_2H_4/SiH_4$) ratio by volume, namely of less than or equal to 3.3. This ratio is preferably between 1 and 3.3 and in particular between 1.5 and 3.3.

This is because, for higher $C_2H_4/SiH_4$ ratios by volume, in particular of greater than 3.4, the carbon content of the silicon oxycarbide sublayer is no longer sufficient to result, after grafting a hydrophobic agent, in lasting hydrophobic properties. The discovery of the connection between the $C_2H_4/SiH_4$ ratio by volume and the carbon content of the SiOC layers obtained, and also the effects on the durability of the grafted hydrophobic layers, has formed the subject matter of a separate patent application filed on the same day as the present patent application.

There exist numerous methods for depositing thin silica layers at the surface of a glass substrate. Mention may be made, by way of example, of chemical vapor deposition (CVD) using, as precursor, tetraethoxysilane (TEOS), plasma-enhanced chemical vapor deposition (PECVD), vacuum cathode sputtering supported by a magnetic field (magnetron sputtering) or a combination of these last two techniques (magnetron-PECVD).

For stage (b'), advantage may be taken of the discovery by the Applicant Company that the deposition of a SiOC layer by CVD using a high $C_2H_4/SiH_4$ ratio by volume results in layers which are relatively poor in carbon. Consequently, stage (b') preferably comprises bringing the silicon oxycarbide layer formed in stage (a) into contact, at a temperature of between 600° C. and 680° C., preferably between 610° C. and 660° C., with a stream of reactive gases comprising ethylene ($C_2H_4$), silane ($SiH_4$) and carbon dioxide ($CO_2$), where the ethylene/silane ($C_2H_4/SiH_4$) ratio by volume during stage (b') is greater than 3.4, preferably between 3.5 and 6, in particular between 3.7 and 5.5.

In an advantageous embodiment, advantageous because it is very simple, of this alternative form of the process according to the invention, stages (a) and (b') are carried out inside the float furnace. Two mixtures of reactive gases comprising ethylene ($C_2H_4$), silane ($SiH_4$) and carbon dioxide ($CO_2$) are introduced into the furnace via two separate nozzles, the nozzle introducing the mixture of stage (a) being situated upstream (with respect to the direction of progression of the glass ribbon) of the nozzle introducing the mixture of stage (b').

The silica layer, deposited in stage (b), or the silicon oxycarbide layer, deposited in stage (b'), preferably has a thickness of between 3 and 100 nm, in particular between 5 and 50 nm.

The layers formed in stages (a), (b) and (b') are dense nonporous layers having a refractive index of between 1.45 and 1.9.

After deposition of the silica layer (stage (b)) or of the carbon-poor silicon oxycarbide layer (stage (b')), the substrate covered with the two thin layers is cooled, generally down to ambient temperature, and then it is subjected to an annealing and/or shaping stage, for example a bending.

The product obtained on completion of the annealing stage (c) does not, of course, yet exhibit hydrophobic properties. In order to render it hydrophobic, it is necessary to activate the surface by means of a plasma treatment or of a basic or acidic hydrolysis—so as to render accessible a large number of SiOH groups at the surface of the tie layer—and then to apply within a short period of time, preferably not exceeding a few minutes, a hydrophobic agent capable of reacting with the activated silanol functional groups.

The activation can be carried out in appliances under vacuum or at atmospheric pressure, for example in a parallel plate capacitive RF reactor. The plasma treatment modifies only very slightly, indeed even not at all, the physical morphology of the surface, which retains in particular its roughness. The gas used is generally chosen from the group consisting of $N_2$, $O_2$, $H_2O$ and a mixture of these gases. The Applicant Company has obtained good results using, for the stage of activation by plasma, a mixture of $N_2$ and $H_2O$ obtained by sparging a stream of nitrogen into deionized water at ambient temperature. The water/nitrogen mixture comprises up to 3% by volume of water. The operating pressure is adjusted to a value of between 75 and 300 mtorr, the power of the reactor is adjusted to a value of between 150 and 5000 W and the duration of the activation stage is generally between 1 minute and approximately 15 minutes, typically between 5 and 10 minutes.

When the activation is carried out by the liquid route, the surface of the layer is brought into contact, for at least a few seconds, indeed even a few minutes, with a solution of a strong base at a pH >10 or a solution of a strong acid exhibiting a pH <4.

The activation stage is preferably carried out immediately before the stage (e) of covalent grafting of a hydrophobic agent. This is because the silanol functional groups created by the activation are capable of reacting with one another or with components of the atmosphere and then again become unavailable for the attaching of the hydrophobic agent.

In a preferred embodiment of the process of the invention, stage (e) is carried out less than 30 minutes, preferably less than 15 minutes and in particular less than 5 minutes after the end of the activation stage (stage (d)).

The hydrophobizing stage can in principle be carried out by any known technique, such as immersion, spraying, centrifuging, atmospheric or vacuum plasma deposition, or using a rag (application of a solution of the hydrophobic agent using an impregnated rag).

In principle, it is possible, in the present invention, to use any hydrophobic agent capable of forming covalent bonds with the silanol groups of the silicon oxycarbide layer. Such agents are known and are described in particular in the applications EP 0 492 417, EP 0 492 545, EP 0 672 779 and WO 2007/012779. Furthermore, these documents describe different processes for the application of these hydrophobizing reactants.

The hydrophobic agents used in the present invention are preferably chosen from fluoroalkylsilanes of formula:

where:
m=0 to 15, preferably 5 to 9,
n=1 to 5, preferably n=2,
p=0, 1 or 2, preferably 0 or 1, in particular 0,
R is a $C_{1-8}$ alkyl group or a hydrogen atom,
X is a hydrolyzable group, preferably a halogen atom or a $C_{1-4}$ alkoxy group.

It is also possible to envisage the use of compounds of formula:

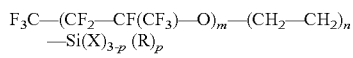

or of formula:

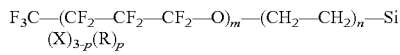

where m=2 to 30, n=1 to 3, preferably n=1, and p, X and R have the meanings indicated above.

The hydrophobic reactants are preferably applied in the form of an acidic aqueous/alcoholic solution prepared at the time of use, for example a solution in ethanol or isopropanol generally comprising less than 15% of aqueous acid, for example hydrochloric acid.

This hydrophobizing solution preferably has a concentration of hydrophobic agent of between 1 and 5% by weight. It is applied to the activated semifinished product using a rag impregnated with said solution. The duration of this operation in which the hydrophobic agent is brought into contact with the activated surface is preferably between 5 and 60 minutes, preferably between 10 and 30 minutes. The excess hydrophobic agent can subsequently be removed by rinsing with alcohol.

The hydrophobic glazing of the present invention is preferably a motor vehicle glazing, in particular a windshield.

However, its lasting hydrophobic properties can also be advantageously used in other fields of use, for example in the field of aviation (aircraft windshields), the construction industry (glazed windows or doors), furniture (mirrors, storage shelves, shelves for domestic electrical appliances, shower cubicle components, partitions), street furniture (bus stops), display screens (television, computers, touch-sensitive screens), and the like.

The following examples illustrate the present invention without, however, limiting the scope thereof, which is defined solely by the claims.

EXAMPLES

Two hydrophobic glazings according to the invention are prepared by the following process:

a) deposition of a carbon-rich silicon oxycarbide layer by CVD ($C_2H_2$, $SiH_4$, $CO_2$, diluent $N_2$) using a nozzle with a width of 3.3 m over a substrate made of clear float glass at a temperature of 650° C. (temperature of the tin bath in the immediate vicinity of the nozzle); the width of the ribbon is 3.6 m, its thickness is 2.8 mm and its rate of progression is 16.7 m/min; the flow rates of the reactive gases are as follows: $SiH_4$ (20.2 Sl/min), $C_2H_4$ (35 Sl/min) and $CO_2$ (30 Sl/min) in an $N_2$ diluent; $C_2H_2/SiH_4$ ratio by volume=1.73;

b) deposition of a silica layer by magnetron sputtering having a thickness of 5 nm or 15 nm;

c) annealing at a temperature of 640° C. for 8 minutes, d) activation by an $H_2O/N_2$ plasma, and e) grafting the hydrophobic agent by applying, with a rag, a solution comprising 2% of $CF_3$—$(CF_2)_7$—$(CH_2)_2$—Si(OEt) in a mixture of isopropanol and aqueous acid (0.3N HCl) (90/10).

Furthermore, a comparative hydrophobic glazing is prepared by a process comprising the stages (a), (c), (d) and (f) but which does not comprise the deposition of a silica layer (stage (b)).

The hydrophobic nature of the finished products is evaluated by measurement of the contact angle ($\theta_{initial}$) of a drop of deionized water using a Krüss automatic tensiometer. The higher the contact angle, the more hydrophobic the finished product.

All the samples are subsequently subjected to accelerated aging, during which the sample is subjected to cycles of artificial rain, drying, illumination and wiping with windshield wiper blades. The total duration of the accelerated aging is 32 000 minutes.

At the end of this accelerated aging, the contact angle ($\theta_{final}$), which decreases for all of the samples, is again measured. The loss of the contact angle is equal to $\theta_{initial}-\theta_{final}$.

In addition, table 1 presents the results of a scratch resistance test (Erichsen Scratch Test) which consists in applying a uniform force (via a standardized tip) to a sample driven with a rotating movement. The force (F), expressed in newtons (N), corresponding to the appearance of a scratch visible to the naked eye is recorded.

TABLE 1

| Example | $SiH_4$ (Sl/min) | $C_2H_4$ (Sl/min) | $CO_2$ (Sl/min) | Thickness $SiO_2$ layer | $C_2H_4/SiH_4$ | $\Theta_{initial}$ | $\Theta_{initial}-\Theta_{final}$ | F (N) |
|---|---|---|---|---|---|---|---|---|
| 1 (comp.) | 20.02 | 35 | 30 | — | 1.73 | 116 | 14° | 0.5 |
| 2 (invention) | 20.02 | 35 | 30 | 5 nm | 1.73 | 117 | 11° | >2 |
| 3 (invention) | 20.02 | 35 | 30 | 15 nm | 1.73 | 119 | 13° | >2 |

These results show that the presence of a thin $SiO_2$ layer makes it possible to significantly improve the scratch resistance of the hydrophobic glazings without this resulting in a deterioration in the durability of the hydrophobic nature of the glazings. In fact, the loss of the contact angle is substantially identical for the three examples.

The invention claimed is:

1. A process for manufacturing a hydrophobic glazing, the process comprising:
   forming a carbon-rich silicon oxycarbide ($SiO_xC_y$) layer at a surface of a mineral glass substrate by chemical vapor deposition (CVD) over at least a portion of the surface of the substrate by contacting the surface with a stream of reactive gases comprising ethylene ($C_2H_4$), silane ($SiH_4$), and carbon dioxide ($CO_2$) with an ethylene/silane ($C_2H_4/SiH_4$) ratio by volume of less than or equal to 3.3, at a temperature of between 600° C. and 680° C., wherein the carbon-rich $SiO_xC_y$ layer has a mean C/Si ratio of greater than 0.4;

forming an $SiO_2$ layer or a carbon-poor $SiO_xC_y$ layer with a mean C/Si ratio of less than 0.2 on the carbon-rich $SiO_xC_y$ layer, to obtain a layered substrate;

annealing and/or shaping the layered substrate at a temperature of between 580° C. and 700° C.;

activating the $SiO_2$ layer or the carbon-poor $SiO_xC_y$ layer by plasma treatment or acidic or basic chemical treatment; and grafting, by covalent bonding, a fluorinated hydrophobic agent to the surface of the $SiO_2$ layer or the carbon-poor $SiO_xC_y$ layer.

2. The process of claim 1, wherein the mineral glass substrate is float glass and the carbon-rich $SiO_xC_y$ layer is formed on the float glass inside a furnace on a tin bath or immediately after exiting from a furnace.

3. The process of claim 1, comprising forming the $SiO_2$ layer by CVD with, as precursor, tetraethoxysilane, plasma-enhanced chemical vapor deposition (PECVD), vacuum cathode sputtering supported by a magnetic field (magnetron sputtering), or a combination of the PECVD and the magnetron sputtering (magnetron-PECVD).

4. The process of claim 1, comprising forming the carbon-poor $SiO_xC_y$ layer by CVD, which comprises contacting the carbon-rich $SiO_xC_y$ layer with a stream of reactive gases comprising ethylene ($C_2H_4$), silane ($SiH_4$), and carbon dioxide ($CO_2$) with an ethylene/silane ($C_2H_4/SiH_4$) ratio by volume of greater than 3.4 at a temperature of between 600° C. and 680° C.

5. The process of claim 4, wherein the carbon-rich $SiO_xC_y$ layer and the carbon-poor $SiO_xC_y$ layer are formed inside a float furnace, and wherein the streams of reactive gases comprising ethylene ($C_2H_4$), silane ($SiH_4$), and carbon dioxide ($CO_2$) are introduced into the furnace via two separate nozzles: a first nozzle introducing the stream of forming the carbon-rich $SiO_xC_y$ upstream of a second nozzle introducing the stream of forming the carbon-poor $SiO_xC_y$.

6. The process of claim 1, wherein the carbon-rich $SiO_xC_y$ layer has a thickness of between 10 and 200 nm.

7. The process of claim 1, wherein the $SiO_2$ layer or the carbon-poor $SiO_xC_y$ layer has a thickness of between 3 and 100 nm.

8. The process of claim 1, wherein the fluorinated hydrophobic agent is a fluoroalkylsilane of formula (I):

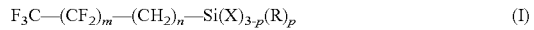

$$F_3C\text{---}(CF_2)_m\text{---}(CH_2)_n\text{---}Si(X)_{3-p}(R)_p \quad (I)$$

wherein:
m=0 to 15;
n=1 to 5;
p=0, 1 or 2;
R is a $C_{1-8}$ alkyl group or a hydrogen atom; and
X is a hydrolyzable group.

9. The process of claim 1, wherein the grafting comprises applying the hydrophobic agent as an acidic aqueous/alcoholic solution.

10. The process of claim 1, wherein the carbon-rich $SiO_xC_y$ layer is formed at a temperature of between 610° C. and 660° C.;

the process comprises forming the $SiO_2$ layer or the carbon-poor $SiO_xC_y$ layer, the carbon-poor $SiO_xC_y$ layer having a mean C/Si ratio of less than 0.1; and wherein the annealing and/or shaping is at a temperature of between 600° C. and 680° C.

11. The process of claim 6, wherein the carbon-rich $SiO_xC_y$ layer has a thickness between 20 and 100 nm.

12. The process of claim 7, wherein the $SiO_2$ layer or the carbon-poor $SiO_xC_y$ layer has a thickness of between 5 and 50 nm.

13. The process of claim 8, wherein, in formula (I):
m is from 5 to 9;
n is 2;
p is 0 or 1; and
X is a halogen atom or a C1-4 alkoxy group.

* * * * *